United States Patent Office 2,766,129
Patented Oct. 9, 1956

2,766,129

HIGH TEMPERATURE CERAMIC COMPOSITION

Chester A. Marcowka, Milwaukee, Wis., assignor, by mesne assignments, to the United States of America as represented by the United States Atomic Energy Commission No Drawing. Application September 21, 1953, Serial No. 381,500

5 Claims. (Cl. 106—48)

This invention relates to a ceramic composition and more particularly to a ceramic composition which when applied as a coating to stainless steel will protect the stainless steel from oxidation at high temperatures.

The object of the present invention is to provide a ceramic coating for stainless steel which will protect the stainless steel from intergranular oxidation at elevated temperatures in the range of 1800° to 2000° F.

Intergranular oxidation of stainless steel frequently occurs when the stainless steel is subjected to high temperatures for extended periods of time. To prevent this oxidation, attempts have been made to coat the stainless steel with various ceramic compositions. However, the ceramic compositions have not proven satisfactory when applied to stainless steel and maintained at high temperatures for long periods for they tend to crack, spall, or permit oxygen penetration and the subsequent formation of oxides beneath the coating.

This invention is directed to a high temperature ceramic composition for application to stainless steel which is formed by mixing a base frit having a high viscosity at elevated temperatures with refractory additions of alumina and lanthana. This mixture, having the necessary additions of clay and water to form a slip, is applied to the stainless steel as a thin coating. The coated stainless steel is fired at a temperature of about 1900° F. to fuse the ceramic composition to the stainless steel. The resulting coating will protect the stainless steel against oxidation at temperatures up to 2000° F. for periods of over 100 hours.

The base frit of the ceramic coating has the following general composition by weight:

| | Percent |
|---|---|
| BeO | 2.8– 3.1 |
| $K_2O$ | 3.5– 4.1 |
| MgO | 1.3– 1.8 |
| $Na_2O$ | 8.0–11.0 |
| $Al_2O_3$ | 5.5– 7.0 |
| $SiO_2$ | 71.0–74.0 |
| $TiO_2$ | 2.5– 4.0 |

A preferred composition of the frit by weight is as follows:

| | Percent |
|---|---|
| BeO | 3.0 |
| MgO | 1.7 |
| $K_2O$ | 3.8 |
| $Na_2O$ | 9.9 |
| $Al_2O_3$ | 6.1 |
| $SiO_2$ | 72.5 |
| $TiO_2$ | 3.0 |
| | 100.0 |

The beryllia, BeO, has a high ionic potential and thereby functions to hold the ceramic structure together.

The potassium oxide, $K_2O$, and the magnesium oxide, MgO, serve to increase the viscosity of the material and maintain the composition in a non-fluid state at elevated temperatures.

The soda, $Na_2O$, functions as a carrier or flux and gives body to the frit.

The alumina in the frit, $Al_2O_3$, serves as a glass stabilizer and gives the resulting ceramic composition a firm structure. The alumina prevents devitrification of the ceramic.

The silica, $SiO_2$, functions as a glass former and gives the composition a high resistance to heat.

The titanium dioxide, $TiO_2$, serves to improve the adherence of the ceramic composition to the stainless steel.

The slip generally has the following composition in parts by weight:

| | |
|---|---|
| Frit | 100 |
| Alumina | 18–22 |
| Lanthana | 8–10 |
| Clay | 8–10 |
| Water | 61–65 |

A preferred illustration of the composition of the slip in parts by weight which gives very satisfactory results is as follows:

| | |
|---|---|
| Frit | 100 |
| Alumina | 20 |
| Lanthana | 10 |
| Clay | 9 |
| Water | 63 |

The alumina and lanthana combine to provide the ceramic composition with high refractory properties and an increased softening point. The alumina and lanthana are preferably employed in a weight ratio of about two parts alumina to one part lanthana. This ratio may vary slightly depending on the particular properties desired in the resulting ceramic but generally a two to one ratio of these compounds produces a very satisfactory composition. The exact nature of the co-action between the alumina and lanthana is not known other than the elimination of one of the compounds or a substantial change of the 2 to 1 ratio therebetween will result in a coating which will not satisfactorily adhere to stainless steel at temperatures in the neighborhood of 2000° F.

The clay employed in the slip may be any of the conventional enameling clays or a mixture of the usual clays employed as a suspending agent in ceramic compositions.

In addition a small amount of an electrolyte, such as sodium nitrite, $NaNO_2$, or any other compound commonly employed as an electrolyte in ceramic compositions, may be added to the slip to change the state of aggregation of the clay and control the flow and suspension characteristics of the same.

The amount of water employed in the slip helps determine the consistency of the same. While a proportion of 61 to 65 parts by weight of water is preferred for most coating applications, this proportion may be varied over wide limits depending on the consistency desired for any particular application.

The slip may be applied to any type of stainless steel which will not warp on heating at a temperature of approximately 2000° F. or have excessive critical changes on cooling from that temperature.

Stainless steel of the austenitic variety, such as types 309 and 310, having 25% chromium—12% nickel and 25% chromium—20% nickel, respectively, are examples of stainless steels to which the composition of the present invention may be successfully applied.

The slip is applied as a thin coating to the stainless steel article. The coating may preferably have a thickness of .001 to .003 of an inch and this coating presents a dense surface having firm cohesive bonds which prevent oxygen from penetrating through the coating to the stainless steel.

To prepare the base frit, the ingredients are mixed together in powdered form. The mixture is then heated in a suitable furnace to a temperature of about 2550° F. until the mixture is completely in the molten state. The heating may take about an hour to render the ingredients to this molten form.

The melt is then poured into water and quenched to make the frit. The frit is then dried by any conventional means, such as heating over a flame, until the water vapor is driven off.

The dried frit is then ground to a powdered state and mixed in the proper proportions with the alumina, lanthana, clay and water to form the slip.

The stainless steel article is thereafter coated with the slip by dipping, spraying or the like, dried and subsequently fired at a temperature of about 1900° F. for a period of about 10 minutes.

The bisque fuses to the stainless steel during the firing to provide a dense hard coating which will effectively protect the stainless steel against intergranular oxidation at temperatures up to 2000° F. The ceramic composition of the invention has successfully protected the stainless steel against oxidation at high temperatures for extended periods of time of over 100 hours.

Various modes of carrying out the invention may be employed within the scope of the accompanying claims which particularly point out and distinctly set forth the subject matter regarded as the invention.

I claim:

1. A base frit for a ceramic composition to be applied to stainless steel to protect the same against oxidation at high temperatures consisting by weight of about 3.0% BeO, about 3.8% $K_2O$, about 1.7% MgO, about 9.9% $Na_2O$, about 6.1% $Al_2O_3$, about 3.0% $TiO_2$ and about 72.5% $SiO_2$.

2. A ceramic composition to be applied to stainless steel as a coating to protect the stainless steel from oxidation at elevated temperatures, consisting by weight of about 100 parts of a base frit, about 20 parts of alumina, about 10 parts of lanthana, about 9 parts of clay and about 63 parts of water, said frit having the following composition by weight:

| | Percent |
|---|---|
| BeO | 3.0 |
| $K_2O$ | 3.8 |
| MgO | 1.7 |
| $Na_2O$ | 9.9 |
| $Al_2O_3$ | 6.1 |
| $TiO_2$ | 3.0 |
| $SiO_2$ | 72.5 |

3. A base frit for a high temperature ceramic composition to be applied to stainless steel to protect the same against oxidation at high temperature consisting of by weight:

| | Percent |
|---|---|
| BeO | 2.8– 3.1 |
| $K_2O$ | 3.5– 4.1 |
| MgO | 1.3– 1.8 |
| $Na_2O$ | 8.0–11.0 |
| $Al_2O_3$ | 5.5– 7.0 |
| $TiO_2$ | 2.5– 4.0 |
| $SiO_2$ | 71.0–74.0 |

4. A ceramic composition to be applied to stainless steel as a coating to protect the stainless steel from oxidation at elevated temperatures, consisting by weight of about 100 parts of a high temperature base frit, about 18 to 22 parts alumina, about 8 to 12 parts lanthana, about 8 to 10 parts clay, and a sufficient amount of water to give the composition the necessary consistency for application to stainless steel as a coating, said frit comprising by weight:

| | Percent |
|---|---|
| BeO | 2.8– 3.1 |
| $K_2O$ | 3.5– 4.1 |
| MgO | 1.3– 1.8 |
| $Na_2O$ | 8.0–11.0 |
| $Al_2O_3$ | 5.5– 7.0 |
| $TiO_2$ | 2.5– 4.0 |
| $SiO_2$ | 71.0–74.0 |

5. A composite structure comprising an austenitic type stainless steel base, and a ceramic composition applied to the base as a coating to protect the stainless steel against oxidation at temperatures up to 2000° F., said ceramic composition having the following composition in parts by weight:

| | |
|---|---|
| Base frit | 100 |
| Alumina | 18–22 |
| Lanthana | 8–12 |
| Clay | 8–10 |
| Water | 61–65 | said frit having the following composition in percentage by weight:

| | Percent |
|---|---|
| BeO | 2.8– 3.1 |
| $K_2O$ | 3.5– 4.1 |
| MgO | 1.3– 1.8 |
| $Na_2O$ | 8.0–11.0 |
| $Al_2O_3$ | 5.5– 7.0 |
| $TiO_2$ | 2.5– 4.0 |
| $SiO_2$ | 71.0–74.0 |

No references cited.